United States Patent [19]

Parvaresh

[11] Patent Number: 5,269,575

[45] Date of Patent: Dec. 14, 1993

[54] DOG WASTE SCOOP AND COOPERATING BAG

[76] Inventor: Kambiz Parvaresh, 19 Edwards St., Binghamton, N.Y. 13905

[21] Appl. No.: 942,790

[22] Filed: Sep. 10, 1992

[51] Int. Cl.$^5$ .................................................. A01K 29/00
[52] U.S. Cl. ......................................................... 294/1.5
[58] Field of Search ................... 294/1.3, 1.4, 1.5, 55; 15/257.1, 257.2, 104.8

[56] References Cited

U.S. PATENT DOCUMENTS

| 3,786,780 | 1/1974 | Pezzino | 294/1.5 |
| 4,222,597 | 9/1980 | Willis | 294/1.4 |
| 4,262,948 | 4/1981 | Emme | 294/1.5 |
| 4,335,678 | 6/1982 | Garza et al. | 294/1.5 |

FOREIGN PATENT DOCUMENTS

| 2629342 | 4/1977 | Fed. Rep. of Germany | 294/1.4 |
| 2804553 | 8/1979 | Fed. Rep. of Germany | 294/1.5 |
| 3807221 | 9/1989 | Fed. Rep. of Germany | 294/1.5 |
| 3811273 | 10/1989 | Fed. Rep. of Germany | 294/1.5 |
| 2613740 | 10/1988 | France | 294/1.4 |

*Primary Examiner*—David M. Mitchell
*Assistant Examiner*—Dean J. Kramer
*Attorney, Agent, or Firm*—Richard L. Miller

[57] ABSTRACT

A dog waste scoop is provided which consists of an elongated handle having a hand grip at an upper end, a flat tray having a center slot, a bracket for securing the flat tray to a lower end of said elongated handle, so that said flat tray will project outwardly from the elongated handle opposite from the end grip. A disposable plastic bag having a closed end and an open end is also provided. The closed end can be inserted into the center slot in the flat tray with the open end flattened down upon the flat tray, so that dog feces can be deposited into the disposable plastic bag for removal.

1 Claim, 1 Drawing Sheet

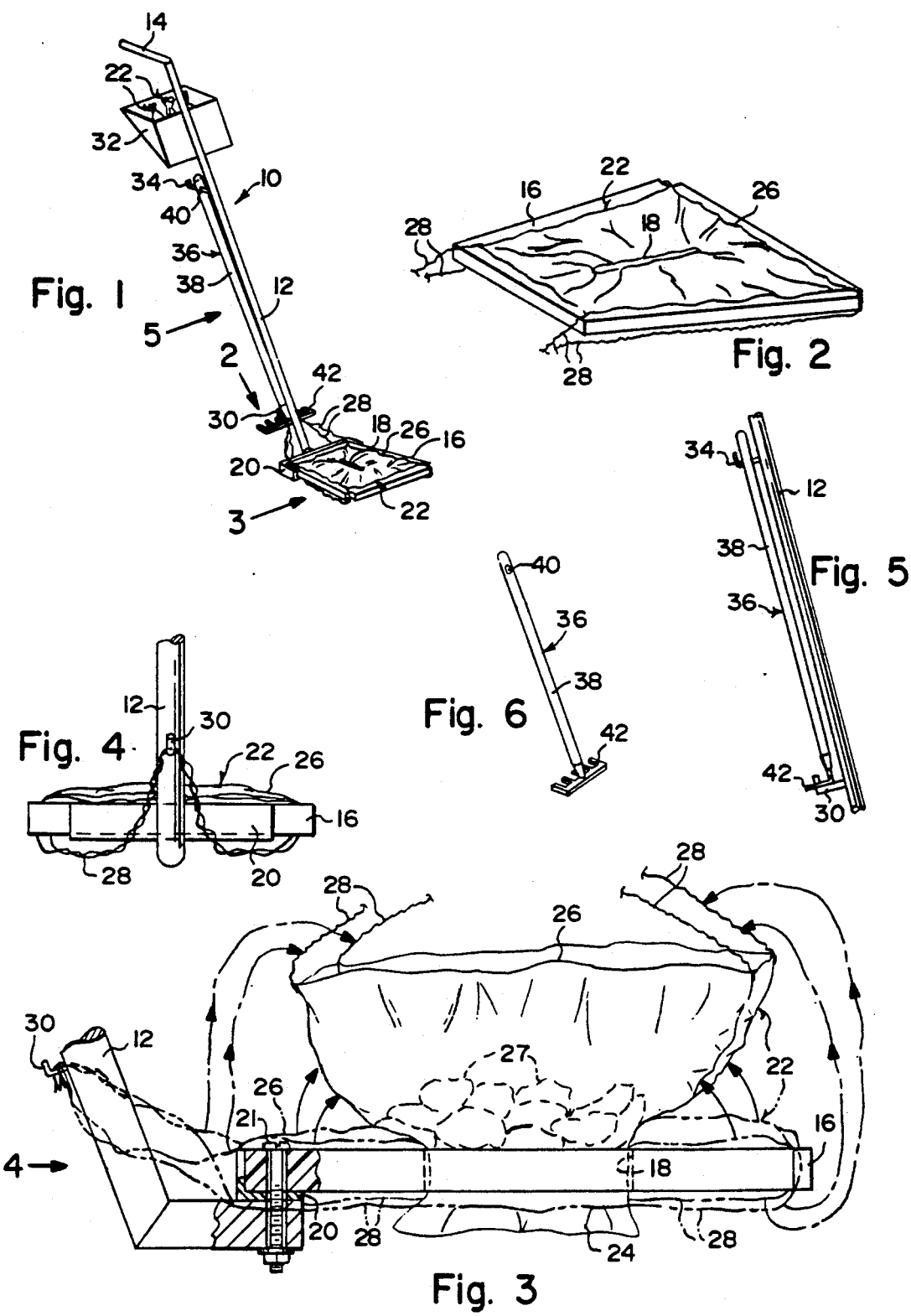

DOG WASTE SCOOP AND COOPERATING BAG

BACKGROUND OF THE INVENTION

The instant invention relates generally to feces pickup devices and more specifically it relates to a dog waste scoop.

Numerous feces pickup devices have been provided in the prior art that are adapted to remove and dispose animal feces that are deposited on the ground. For example, U.S. Pat. Nos. 3,977,715 to Casci; 4,205,869 to Mathis and Des. 283,262 to Kline all are illustrative of such prior art. While these units may be suitable for the particular purpose to which they address, they would not be as suitable for the purpose of the present invention as hereafter described.

SUMMARY OF THE INVENTION

A primary object of the present invention is to provide a dog waste scoop that will overcome the shortcomings of the prior art devices.

Another object is to provide a dog waste scoop which will properly position a disposable plastic bag with strings carried on a tray under a dog, so that the dog will deposit their feces directly into the plastic bag and the strings pulled to seal the plastic bag for disposal thereof.

An additional object is to provide a dog waste scoop that contains a rake tool to help push the feces over the tray and into the plastic bag if the dog misses.

A further object is to provide a dog waste scoop that is simple and easy to use.

A still further object is to provide a dog waste scoop that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention;

FIG. 2 is an enlarged diagrammatic perspective view taken generally in the direction of arrow 2 in FIG. 1, of just the tray and plastic bag per se;

FIG. 3 is an enlarged diagrammatic side view with parts broken away and in section taken in the direction of arrow 3 in FIG. 1;

FIG. 4 is an enlarged rear view taken in the direction of arrow 4 in FIG. 3;

FIG. 5 is an enlarged side view with parts broken away taken in the direction of arrow 5 in FIG. 1 showing the rake tool secured to the handle; and FIG. 6 is a diagrammatic perspective view of just the rake tool per se.

DETAILED DESCRIPTION OF THE PREFERRED EMBODIMENTS

Turning now descriptively to the drawings, in which similar reference characters denote similar elements throughout the several views, the Figures illustrate a dog waste scoop 10 which consists of an elongated handle 12 having a hand grip 14 at an upper end, a flat tray 16 having a center slot 18 and a bracket 20 for securing the flat tray 16 by a fastener 21 to a lower end of the elongated handle 12, so that the flat tray 16 will project outwardly from the elongated handle 12 opposite from the hand grip 14. A disposable plastic bag 22 is also provided, having a closed end 24 and an open end 26. The closed end 24 is inserted into the center slot 18 in the flat tray 16 with the open end 26 flattened down upon the flat tray 16, so that dog feces 27 can be deposited into the disposable plastic bag 22 for removal.

A plurality of strings 28 are located about the open end 26 of the disposable plastic bag 26. A hook member 30 is affixed to and located near the lower end of the elongated handle 12 on the same side as the hand grip 14. The strings 28 can be secured to or other wise wrapped about the hook member 30, when the open end 26 is flattened down upon the flat tray 16. The strings 28 can be released from the hook members and pulled up to seal the open end 26 for disposal thereof.

A container 32 is mounted to the elongated handle 12 on the same side and below the hand grip 14 for holding a plurality of sealed disposable plastic bags 22 with the dog feces 27 therein for discard at a later time.

A second hook member 34 is affixed to and located near the upper end of the elongated handle 12 below the container 32. A rake tool 36 is provided, having a handle 38 with a hole 40 at a first end and a set of teeth 42 at a second end. The rake tool 36 can be used to help push the dog feces 27 over the flat tray 16 and into the disposable plastic bag 22. The rake tool 36 can be stored on the scoop 10 by placing the hole 40 in the rake handle 38 over the second hook member 34 and the set of teeth 42 onto the first hook member 30.

To use the scoop 10 a person inserts the closed end 24 of the disposable plastic bag 22 into the center slot 18 and flattens the open end 26 onto the flat tray 16. The strings 28 are then tied about the first hook member 30. The flat tray 16 is placed under the dog, so that the feces 27 can drop directly into the disposable plastic bag 22. The strings 28 are loosened and pulled up to seal the open end 26 for disposal. If the dog misses the disposable plastic 22 or the scoop 10 was not used when the dog deposited the feces 27 upon the ground, the rake tool 36 can then be used to push the feces 27 over the flat tray 16 and into the disposable plastic bag 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dog waste scoop and cooperating bag which comprises:
   a) as elongated handle having a hand strip at an upper end;
   b) a flat tray having a center slot;
   c) a bracket for securing said flat tray to a lower and of said elongated handle, so that said flat tray will project outwardly from said elongated handle opposite from said hand grip;
   d) a disposable plastic bag having a closed end and an open end, whereby said closed end is inserted into said center slot in said flat tray with said open end flattened down upon said flat tray, so that dog feces can be deposited into said disposable plastic bag for removal;

e) a plurality of strings located about said open end of said disposable plastic bag;

f) a hook member affixed to and located near the lower end of said elongated handle on the same side as said hand grip, so that said strings can be wrapped about said hook member when said open end is flattened down upon said flat tray and said strings can be pulled up to seal said open end for disposal thereof;

g) a container mounted to said elongated handle on the same side said below said hand grip for holding a plurality of used disposable plastic bags with the dog feces therein for discard at a later time;

h) a second hook member affixed to and located near the upper end of said elongated handle below said container; and i) a rake tool having a handle with a hole at a first end and a set of teeth at a second end, so that said rake tool can be used to help push the dog feces over said flat tray and into said disposable plastic bag, while said rake tool can be stored on said scoop by placing the hole in said rake handle over said second hook member and the set of teeth onto said first hook member.

* * * * *